US008166136B2

(12) United States Patent
Tanimura et al.

(10) Patent No.: US 8,166,136 B2
(45) Date of Patent: Apr. 24, 2012

(54) PERFORMANCE RESERVATION STORAGE MANAGEMENT SYSTEM, STORAGE MANAGEMENT METHOD, AND STORAGE MEDIUM

(75) Inventors: Yusuke Tanimura, Ibaraki (JP); Tomohiro Kudoh, Ibaraki (JP); Isao Kojima, Ibaraki (JP); Yoshio Tanaka, Ibaraki (JP)

(73) Assignee: National Institute of Advanced Industrial Science and Technology, Tokyo (JP)

( * ) Notice: Subject to any disclaimer, the term of this patent is extended or adjusted under 35 U.S.C. 154(b) by 65 days.

(21) Appl. No.: 12/646,480

(22) Filed: Dec. 23, 2009

(65) Prior Publication Data
US 2010/0169454 A1 Jul. 1, 2010

(30) Foreign Application Priority Data
Dec. 24, 2008 (JP) ................................. 2008-328089

(51) Int. Cl.
*G06F 15/16* (2006.01)
(52) U.S. Cl. ........................................................ 709/219
(58) Field of Classification Search .................... 709/219
See application file for complete search history.

(56) References Cited

U.S. PATENT DOCUMENTS

| | | | |
|---|---|---|---|
| 6,678,733 B1 * | 1/2004 | Brown et al. ................. | 709/229 |
| 6,792,424 B1 * | 9/2004 | Burns et al. ........................... | 1/1 |
| 7,191,216 B2 * | 3/2007 | Mattila et al. ................. | 709/205 |
| 7,734,682 B2 * | 6/2010 | Aubry et al. .................. | 709/203 |
| 2006/0206621 A1 * | 9/2006 | Toebes et al. .................. | 709/238 |
| 2006/0236056 A1 * | 10/2006 | Nagata ........................... | 711/165 |
| 2009/0077097 A1 * | 3/2009 | Lacapra et al. ................. | 707/10 |
| 2009/0300605 A1 * | 12/2009 | Edwards et al. ................... | 718/1 |

FOREIGN PATENT DOCUMENTS

| | | |
|---|---|---|
| JP | 5-204815 A | 8/1993 |
| JP | 2002-152274 A | 5/2002 |
| JP | 2002-244899 A | 8/2002 |
| JP | 2008-176455 A | 7/2008 |

OTHER PUBLICATIONS

Wei et al., "QoS-aware Striping with Replication Model for Object-based Multimedia Storage", Fourth International Workshop on Storage Network Architecture and Parallel I/Os, 2007, pp. 114-121.
Haskins et al., "The Tiger Shark File System", Proceedings of the 41st IEEE International Computer Conference, COMPCON, 1996, pp. 226-231.

* cited by examiner

*Primary Examiner* — Wing Chan
*Assistant Examiner* — Alicia Baturay
(74) *Attorney, Agent, or Firm* — Birch, Stewart, Kolasch & Birch, LLP (57) ABSTRACT

A storage management system (10) is a system for connecting a client terminal (30) to a storage apparatus (111) via a communication network. The storage management system (10) includes: a communication unit (21) that receives a reservation request from the client terminal (30); a reservation management unit (221) that reserves a right of use and a time slot of use of the remaining capability of the storage capability in the storage apparatus (111) in accordance with the reservation request, and manages reservation information indicating the result of the reservation; and a ticket issuance unit (222) that issues a reservation ticket showing the reservation information to the client terminal (30), and transmits the reservation ticket to the client terminal (30). The ticket issuance unit (222) issues the reservation ticket only when the remaining capability is confirmed.

14 Claims, 10 Drawing Sheets

| STORAGE APPARATUS IDENTIFIER | LAST UPDATE TIME | READ RATE | WRITE RATE | TOTAL STORAGE SPACE | FREE STORAGE SPACE |
|---|---|---|---|---|---|
| 0001 | 6:00 Aug 30 2008 | 60 MB/s | 50 MB/s | 1 TB | 500 GB |
| 0002 | 6:00 Aug 30 2008 | 60 MB/s | 50 MB/s | 1 TB | 460 GB |
| 0003 | 6:01 Aug 30 2008 | 50 MB/s | 45 MB/s | 1.5 TB | 1.3 TB |
| 0004 | 6:01 Aug 30 2008 | 50 MB/s | 45 MB/s | 500 GB | 200 GB |
| 0005 | 6:01 Aug 30 2008 | 50 MB/s | 45 MB/s | 1.5 TB | 1 TB |
|  |  |  |  |  |  |

FIG. 3

| REQUEST IDENTIFIER | RESERVATION TICKET IDENTIFIER | START TIME | END TIME | READ RATE REQUEST | WRITE RATE REQUEST | NECESSARY STORAGE SPACE |
|---|---|---|---|---|---|---|
| 000001 | A314556 | 14:00 Sep 1 2008 | 18:00 Sep 1 2008 | 40 MB/s | - | - |
| 000002 | B234506 | 21:00 Sep 5 2008 | 22:00 Sep 5 2008 | - | 60 MB/s | 250 GB |
|  |  |  |  |  |  |  |

FIG. 4

| REQUEST IDENTIFIER | STORAGE APPARATUS IDENTIFIER |
|---|---|
| 0000001 | 0001 |
| 0000001 | 0002 |
| 0000001 | 0004 |
| 0000002 | 0001 |
| 0000002 | 0003 |
| 0000002 | 0005 |
| 0000002 | 0006 |
| 0000002 | 0007 |
| | |

| PATH IDENTIFIER | LAST UPDATE TIME | START POINT IDENTIFIER | END POINT IDENTIFIER | AVALABLE DATA TRANSFER RATE |
|---|---|---|---|---|
| 0001 | 6:00 Aug 30 2008 | EP40001 | EP40002 | 80 MB/s |
| 0002 | 6:00 Aug 30 2008 | EP20005 | EP20006 | 100 MB/s |
| 0003 | 6:01 Aug 30 2008 | EP30002 | EP50002 | 120 MB/s |
| 0004 | 6:01 Aug 30 2008 | EP50002 | EP50003 | 200 MB/s |
|  |  |  |  |  |

FIG. 9

| REQUEST IDENTIFIER | START TIME | END TIME | START POINT IDENTIFIER | END POINT IDENTIFIER | RATE REQUESTED |
|---|---|---|---|---|---|
| 000001 | 14:00 Sep 1 2008 | 18:00 Sep 1 2008 | EP40001 | EP20006 | 40 MB/s |
| 000002 | 21:00 Sep 5 2008 | 22:00 Sep 5 2008 | EP30002 | EP50003 | 100 MB/s |
| | | | | | |

FIG. 10

| REQUEST IDENTIFIER | PATH IDENTIFIER |
|---|---|
| 0000001 | 0001 |
| 0000001 | 0002 |
| 0000002 | 0003 |
| 0000002 | 0004 |
|  |  |

PERFORMANCE RESERVATION STORAGE MANAGEMENT SYSTEM, STORAGE MANAGEMENT METHOD, AND STORAGE MEDIUM

This application is based on Japanese patent application No. 2008-328089, the content of which is incorporated hereinto by reference.

TECHNICAL FIELD

The present invention relates to a technique for connecting a client terminal to a storage apparatus via a communication network.

RELATED ART

A storage apparatus may be formed with a computer that has a storage device (a nonvolatile data storage device) such as a HDD (hard disk drive), an optical disk, a tape device, or a flash memory. For example, a hard disk that is widely used contains a disk serving as a recording medium and a magnetic head, and performs data reading and writing with the use of the magnetic head while rotating the disk at a high speed. Therefore, the access rate varies depending on the sites at which the magnetic head accesses the disk. In a case where more than one data access is simultaneously made to a storage device that is not necessarily a HDD, there occurs a competition for access to the storage device, or a competition for access to the input/output bus connected to the storage device, and, as a result, the rate of access to the data storage area becomes lower.

In recent years, there is an increasing demand for communication services using remote accesses to storage apparatuses via a wide area network such as the Internet. For example, the streaming distribution technique is a technique designed for a client terminal to reproduce video data or audio data in real time while downloading the video data or audio data from a storage apparatus mounted on the server via a communication network such as the Internet. If a large number of accesses exceeding the capability (the read rate or write rate, for example) of the storage apparatus concentrate on the storage apparatus, the quality of service (QoS) to be provided for each of the accesses becomes lower. In view of this, a QoS control technique for maintaining the quality of service at a certain level or higher is being developed.

An example of the QoS control technique is disclosed by Q. Wei, et al., in "QoS-aware Striping with Replication Model for Object-based Multimedia Storage", Proceedings of the Fourth International Workshop on Storage Network Architecture and Parallel I/Os, p.p. 114-121, 2007. This literature suggests a method of tuning parameters to be used for striping (a technique for dividing a data file into segments, and distributing and storing the segments into storage apparatuses), in accordance with the communication environment.

QoS control techniques are disclosed not only in the above literature but also by R. L. Haskin, et al., in "The Tiger Shark file system", Proceedings of the 41st IEEE International Computer Conference, COMPCON, p. 226, 1996), and in Japanese Laid-open Patent Publication Nos. 2002-152274, 2002-244899, H05-204815, and 2008-176455, for example.

[Patented document 1] JP-A No. 2002-152274
[Patented document 2] JP-A No. 2002-244899
[Patented document 3] JP-A No. H05-204815
[Patented document 4] JP-A No. 2008-176455
[Non-Patented document 1] Q. Wei, W. Lin, B. Veeravalli, L. Zeng, "QoS-aware Striping with Replication Model for Object-based Multimedia Storage," Proceedings of the Fourth International Workshop on Storage Network Architecture and Parallel I/Os, pp. 114-121, 2007.
[Non-Patented document 2] R. L. Haskin, F. B. Schmuck, "The Tiger Shark file system," Proceedings of the 41st IEEE International Computer Conference, COMPCON, p. 226, 1996.

DISCLOSURE OF THE INVENTION

The conventional techniques disclosed in the above literatures are basically designed for improving the quality of service for an access request first to arrive from a client terminal, and restricting the quality of service for access requests arriving thereafter. Therefore, if access requests exceeding the capability of a storage apparatus concentrate on the storage apparatus, the quality of service for all the access requests cannot be guaranteed at a uniform level. In such a case, it is difficult for each client terminal to secure a desired read rate or write rate in the storage apparatus.

In view of the above circumstances, the present invention aims to provide a storage management system, a storage management method, and a program that can guarantee the quality of service at a certain level by avoiding access request concentration on a storage apparatus from a large number of client terminals via a communication network.

In one embodiment, there is provided a storage management system that connects a client terminal to a storage apparatus via a communication network. This includes: a communication unit that receives a reservation request from the client terminal; a reservation management unit that reserves in advance the right of use of remaining capability of storage capability in said storage apparatus and a time slot of use of said remaining capability, in accordance with the reservation request, and manages reservation information indicating the result of the reservation; and a ticket issuance unit that issues a reservation ticket showing the reservation information to the client terminal, and transmits the reservation ticket to the client terminal. The ticket issuance unit issues the reservation ticket only when the remaining capability is confirmed.

In another embodiment, there is provided a storage management method for connecting a client terminal to a storage apparatus via a communication network. This storage management method includes: (a) receiving a reservation request from the client terminal; (b) reserving the right of use of the remaining capability of the storage capability in the storage apparatus and a time slot of use of the remaining capability, in accordance with the reservation request, and managing reservation information indicating the result of the reservation; and (c) issuing a reservation ticket showing the reservation information to the client terminal, and transmitting the reservation ticket to the client terminal. The reservation ticket is issued only when the remaining capability is confirmed.

In yet another embodiment, there is provided a program that is read from a computer-readable recording medium, and causes a computer to perform a storage management operation to connect a client terminal to a storage apparatus via a communication network. The storage management operation includes: (a) receiving a reservation request from the client terminal; (b) reserving the right of use of the remaining capability of the storage capability in the storage apparatus and a time slot of use of the remaining capability, in accordance with the reservation request, and managing reservation information indicating the result of the reservation; and (c) issuing a reservation ticket showing the reservation information to the client terminal, and transmitting the reservation ticket to the client terminal. The reservation ticket is issued only when the remaining capability is confirmed.

As described above, by the storage management system, the storage management method, and the program according to the present invention, the right of use and a time slot of use of the remaining capability of the storage capability in a storage apparatus are reserved in accordance with a reservation request sent from a client terminal, and a reservation ticket is issued. The client terminal can certainly use the storage capability reserved through the reservation ticket. Accordingly, access request concentration onto the storage apparatus from a large number of client terminals via a communication network can be prevented, and the quality of service can be guaranteed at a certain level.

BRIEF DESCRIPTION OF THE DRAWINGS

The above and other objects, advantages and features of the present invention will be more apparent from the following description of certain preferred embodiments taken in conjunction with the accompanying drawings, in which.

EMBODIMENTS FOR CARRYING OUT THE INVENTION

The invention will be now described herein with reference to illustrative embodiments. Those skilled in the art will recognize that many alternative embodiments can be accomplished using the teachings of the present invention and that the invention is not limited to the embodiments illustrated for explanatory purposes.

The following is a description of embodiments of the present invention, with reference to the accompanying drawings. In those drawings, like components are denoted by same reference numerals, and the same explanation will not be repeated.

First Embodiment

Figure 1:
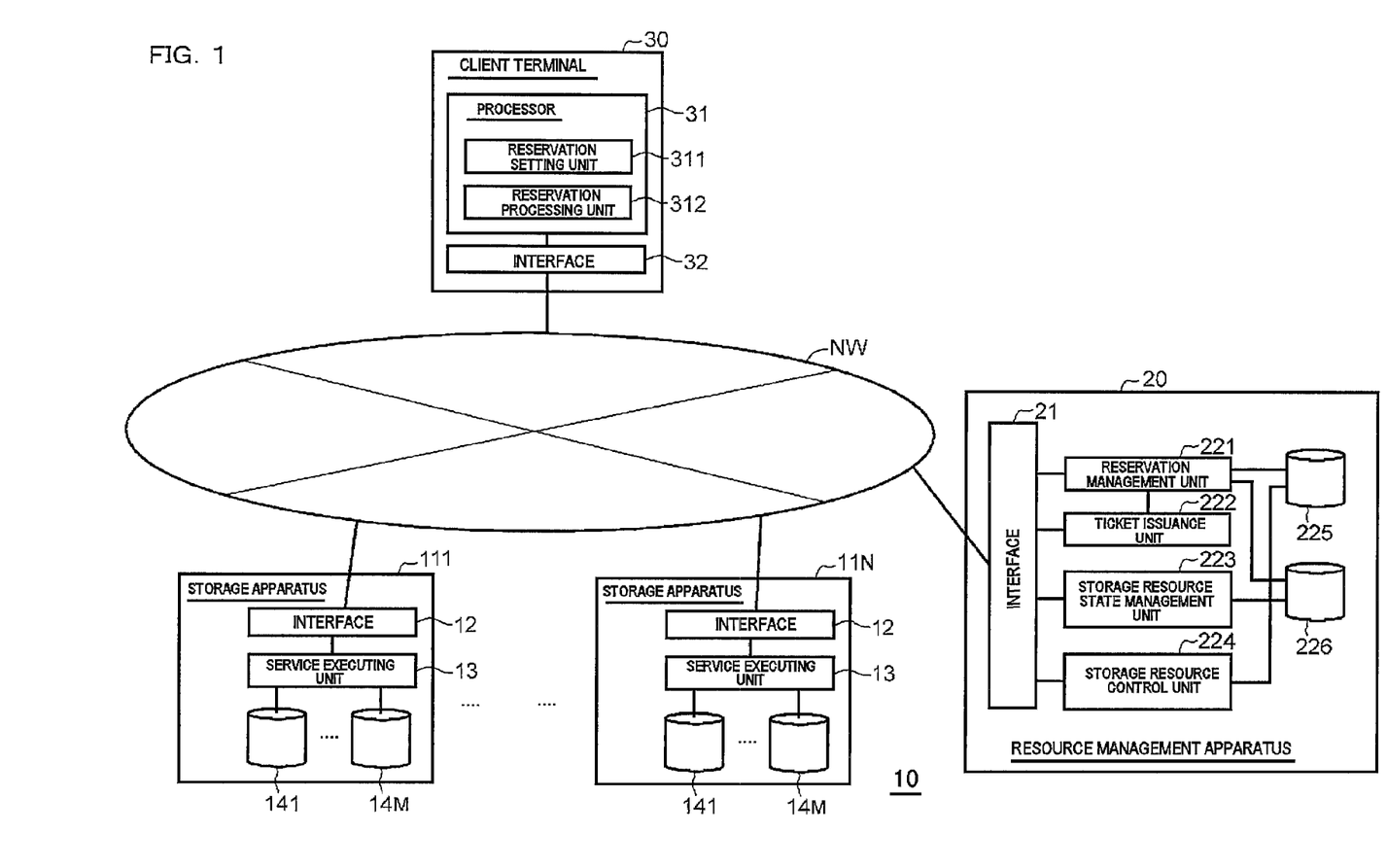
FIG. 1 is a functional block diagram schematically showing the structure of a storage management system according to a first embodiment of the present invention.

FIG. 1 is a functional block diagram schematically showing the structure of a storage management system 10 according to a first embodiment of the present invention. The storage management system 10 includes storage apparatuses 111 through 11N (N being a positive integer of 2 or greater) and a resource management apparatus 20.

Each of the storage apparatuses 111 through 11N has a communication interface 12 connected to a communication network NW. The resource management apparatus 20 also has a communication interface 21 connected to the communication network NW. The communication network NW is not particularly limited. For example, the communication network NW may be a small-scale computer network (a wire or wireless LAN (Local Area Network)) or a large-scale computer network (the Internet or a WAN (Wide Area Network)).

A client terminal 30 includes a processor 31 and a communication interface (I/F) 32, and the processor 31 includes a reservation setting unit 311 and a reservation processing unit 312. The reservation setting unit 311 and the reservation processing unit 312 may be realized by hardware such as a semiconductor integrated circuit, or may be realized by a program or program codes to be read from a recording medium such as a nonvolatile memory or an optical disk and be executed by the CPU.

The reservation setting unit 311 has the function to issue reservation requests to reserve the rights of use of the storage capabilities of the storage apparatuses 111 through 11N. The reservation processing unit 312 uses reservation tickets issued by the resource management apparatus 20, and accesses a storage apparatus 11$i$ of the storage apparatuses 111 through 11N. The reservation processing unit 312 then performs a data communication with the storage apparatus 11$i$, while performing data reading or writing on a data storage area of the storage apparatus 11$i$. The data communication may be a streaming distribution of video data or audio data read from the data storage area of the storage apparatus 11$i$, or may be an operation for a remote backup of the data to be written into the data storage area of the storage apparatus 11$i$, for example.

As shown in FIG. 1, the resource management apparatus 20 includes a communication interface (I/F) 21, a reservation management unit 221, a ticket issuance unit 222, a storage resource state management unit 223, a storage resource control unit 224, a first table storage unit 225, and a second table storage unit 226.

When the communication interface 21 receives a reservation request from the client terminal 30, the reservation management unit 221 selects one storage apparatus 11$i$ of the storage apparatuses 111 through 11N, in response to the reservation request. The reservation management unit 221 reserves in advance the right of use and the time slot of use of the remaining capability (the available capability) of the storage capability in the storage apparatus 11$i$, and records reservation information indicating the result of the reservation in a reservation management table in the first table storage unit 225. The storage capability may include the data read rate and write rate for the data storage area, and the remaining space (the free space or disk space) in the data storage area, for example. If the remaining area in the read rate is 100 MB/sec, for example, the right of use of all or part of the remaining area can be reserved.

The reservation management unit 221 refers to the reservation management table stored in the first table storage unit 225, and also refers to a resource state management table stored in the second table storage unit 226. By doing so, the reservation management unit 221 checks the remaining capacities of the storage apparatuses 111 through 11N, and makes reservations. The reservation management table is formed with a storage resource allocation table and a reservation table. On the storage resource allocation table, the information about the storage resources allocated to reservations is recorded. On the reservation table, the information about reservations received by the reservation management unit 221 is recorded. Request identifiers for referring to the storage resource allocation table are recorded on this reservation table. The reservation histories of the storage capacities in the storage apparatuses 111 through 11N are recorded on the reservation table, and the information indicating the current states of the storage capacities of the storage apparatuses 111 through 11N (the storage resource state information) is recorded on the resource state management table.

Figure 2:
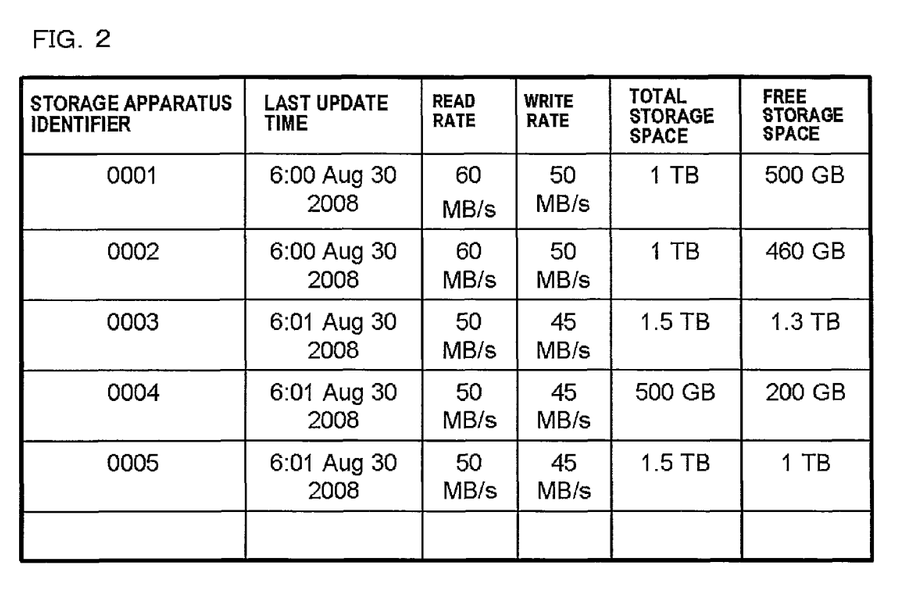
FIG. 2 shows an example of the resource state management table on which the storage resource state information is recorded.
Figure 3:
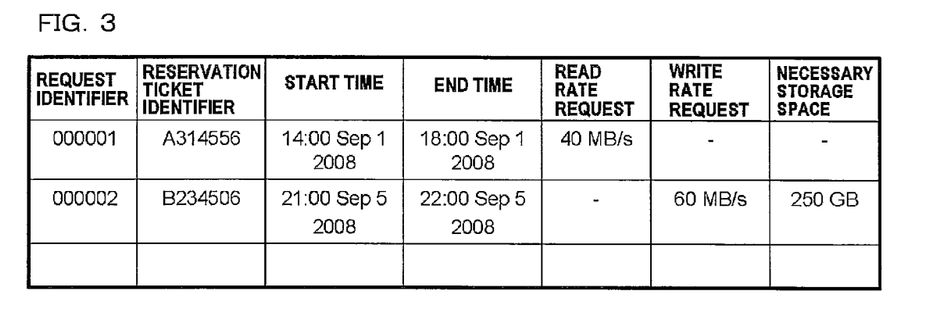
FIG. 3 shows an example of the reservation table.
Figure 4:
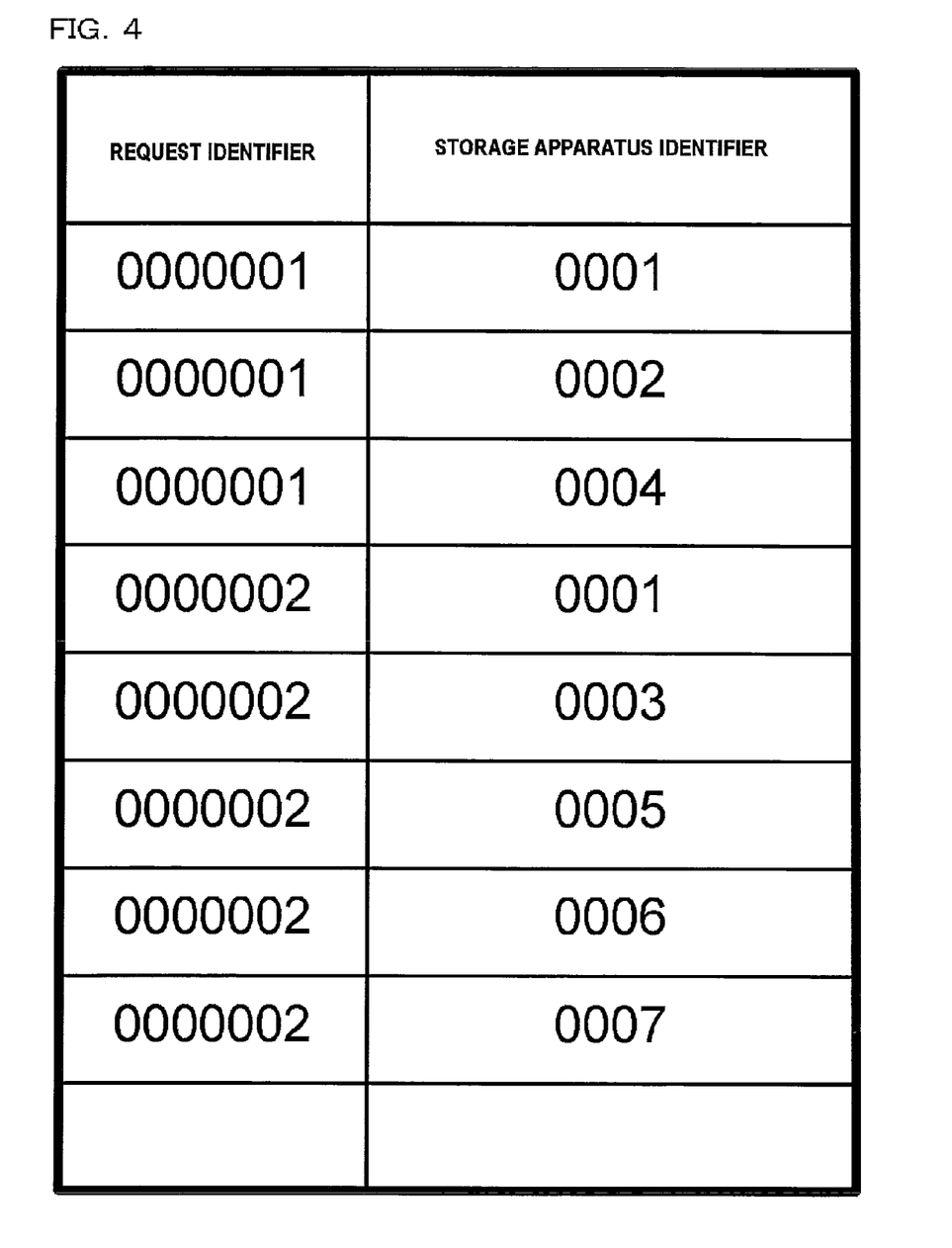
FIG. 4 shows an example of the storage resource allocation table.

FIGS. 2, 3, and 4 show examples of the resource state management table, the reservation table, and the storage resource allocation table, respectively. FIG. 2 shows an example of the resource state management table. As shown in FIG. 2, this resource state management table has the fields of "storage apparatus identifier", "last update time", "read rate", "write rate", "total storage space", and "free storage space". The field of "storage apparatus identifier" indicates the identifiers unique to the respective storage apparatuses 111 through 11N. The field of "last update time" indicates the times and dates of the last update of the information corresponding to the storage apparatus identifiers. The field of "read rate" indicates the read rate in the storage apparatuses corresponding to the respective storage apparatus identifiers. The field of "write rate" indicates the write rate in the storage apparatuses corresponding to the respective storage apparatus identifiers. The field of "total storage space" indicates the upper limits of the storage spaces in the storage apparatuses corresponding to the respective storage apparatus identifiers. The field of "free storage space" indicates the remaining spaces in the storage apparatuses corresponding to the respective storage apparatus identifiers.

FIG. 3 shows an example of the reservation table. As shown in FIG. 3, this reservation table has the fields of "request identifier", "reservation ticket identifier", "start time", "end time", "read rate request", "write rate request", and "necessary storage space". The field of "request identifier" indicates the identifiers uniquely representing reservation requests. The field of "reservation ticket identifier" indicates the identifiers representing reservation tickets issued by the ticket issuance unit 222. The field of "start time" indicates the start times and dates of the reserved time slots of use. The field of "end field" indicates the end times of the reserved time slots of use. The field of "read rate request" indicates reserved read rate. The field of "write rate request" shows reserved write rate. The field of "necessary storage space" indicates reserved storage spaces.

FIG. 4 shows an example of the storage resource allocation table. In the table shown in FIG. 4, the field of "storage apparatus identifier" stores the identifiers representing the storage apparatuses corresponding to the respective request identifiers shown in FIG. 3.

The storage resource state management unit 223 obtains the information indicating the remaining capacities of the storage apparatuses 111 through 11N and the current states such as existence of a failure (the storage resource state information) from the storage apparatuses 111 through 11N via the communication network NW. The storage resource state management unit 223 causes the resource state management table of FIG. 2 to reflect the obtained storage resource state information.

When the resource management apparatus 20 receives a reservation request from the reservation setting unit 311 of the client terminal 30, the reservation management unit 221 refers the capability required through the reservation request to the storage resource state information in the second table storage unit 226, and determines whether the client terminal 30 should use the striping technique. By the striping technique, each one data file is divided into data blocks, and the data blocks are distributed to storage apparatuses and are recorded in a parallel manner. The striping technique can be used to realize the capability (read rate or write rate, for example) that is difficult to obtain by a single storage apparatus. When determining that the client terminal 30 should use the striping technique based on the capability required through the reservation request, the reservation management unit 221 determines the later described striping information. In such a case, the reservation management unit 221 selects n storage apparatuses (n being the striping number) from the storage apparatuses 111 through 11N. The reservation management unit 221 further allocates the selected n storage apparatuses to the client terminal 30, and reserves in advance the right of use and the time slot of use of the remaining capability of the storage capability in the selected n storage apparatuses. The reservation management unit 221 records the reservation information indicating the reservation result on the reservation table, and also records the information about the allocated n storage apparatuses on the storage resource allocation table.

The reservation management unit 221 notifies the connected client terminal 30 of the striping information containing parameters representing the information about the storage apparatuses allocated for the striping, the order of access to the storage apparatuses, the striping unit (the size (divisional unit) of each of the data blocks generated by dividing a data file), and the striping number n. Using the parameters, the reservation processing unit 312 can access each of the allocated n storage apparatuses. Since an access request as well as a reservation ticket arrives at each of the n storage apparatuses from the client terminal 30, each of the service executing units 13 of the n storage apparatuses receives a data block from the client terminal 30 in accordance with the access request. The service executing units 13 then stores the data blocks into storage devices 141 through 14M (data storage areas) allocated to the respective service executing units 13.

When the client terminal 30 reads the data blocks from the n storage apparatuses, on the other hand, the reservation setting unit 311 of the client terminal 30 first issues a reservation request to the reservation management unit 221 of the resource management apparatus 20, to obtain a reservation ticket. The reservation processing unit 312 then requests the reservation management unit 221 of the resource management apparatus 20 for the striping information (including the identifiers of the n storage apparatuses and the address information about the n storage apparatuses). When successfully obtaining the striping information from the resource management apparatus 20, the reservation processing unit 312 issues an access request to the n storage apparatuses identified by the striping information. Using the reservation ticket issued from the resource management apparatus 20, the reservation processing unit 312 accesses the service executing units 13 of the n storage apparatuses, and reads the data blocks from the n storage apparatuses. The reservation processing unit 312 then restores the original data file by uniting the read data blocks.

Not only the client terminal 30 but also other communication terminals can share a data file distributed to the n storage apparatuses by the striping technique. In such a case, each of the communication terminals should have the same function as the reservation processing unit 312 of the client terminal 30 (the function to request the resource management apparatus 20 for the striping information, and access storage apparatuses with the use of the striping information). More specifically, each of the communication terminals first requests the reservation management unit 221 of the resource management apparatus 20 for the striping information. When successfully obtaining the striping information from the resource management apparatus 20, the communication terminal accesses the n storage apparatuses identified by the striping information, and reads the data blocks from the n storage apparatuses. The communication terminal then restores the original data file by uniting the read data blocks.

The ticket issuance unit 222 issues a reservation ticket, only when remaining capability in a storage apparatus 11*i* of the storage apparatuses 111 through 11N is confirmed based on the reservation information supplied from the reservation management unit 221. The ticket issuance unit 222 transmits the reservation ticket to the client terminal 30 via the communication interface 21. If remaining capability is not confirmed in any storage apparatus 11*i* of the storage apparatuses 111 through 11N, the reservation management unit 221 notifies the client terminal 30 to that effect.

Using the reservation ticket received from the ticket issuance unit 222, the reservation processing unit 312 of the client terminal 30 can access a storage apparatus 11*i*. More specifically, upon receipt of an access request and a reservation ticket from the client terminal 30, the service executing unit 13 of the storage apparatus 111 preferentially or exclusively allows an access to the data storage areas of the storage devices 141 through 14M, only when the validity of the reservation ticket is verified.

Since the reservation management unit 221 notifies the storage apparatus 11*i* of the reservation information, the service executing unit 13 of the storage apparatus 11*i* grasps the reservation states of the storage devices 141 through 14M managed by the service executing unit 13. Accordingly, the service executing unit 13 can verify whether the capability and time slot reserved through the reservation ticket are valid.

The ticket issuance unit 222 has the function to generate electronic signature data for verifying the validity of a reservation ticket, and transmit the electronic signature data as well as the reservation ticket to the client terminal 30. Upon receipt of the reservation ticket and the electronic signature data from the client terminal 30, the service executing unit 13 of the storage apparatus 11*i* can verify that the reservation ticket is valid when confirming the validity of the electronic signature data.

The electronic signature data may be generated based on the asymmetrical encryption method using a combination of a verification key (a public key) and an authentication key (a secret key). The ticket issuance unit 222 encrypts the data of a reservation ticket or the compressed data of a reservation ticket (such as the data of a hash function value) with the use of the authentication key, and sets the encrypted data as the electronic signature data. The storage apparatus 111 decrypts the electronic signature data with the use of the verification key, and verifies whether the decrypted data and the reservation ticket match.

The storage resource control unit 224 has the function to remotely control the operations of the storage apparatuses 111 through 11N. For example, the storage resource control unit 224 can temporarily stop the operations of the storage apparatuses 111 through 11N, resume the operations, and switches operation modes of the storage apparatuses 111 through 11N.

Each of the service executing units 13 of the storage apparatuses 111 through 11N may be realized by hardware such as a semiconductor integrated circuit, or may be realized by an application program or program codes recorded on a recording medium such as a nonvolatile memory or an optical disk. Such a program or program codes are designed to cause a computer having a processor such as a CPU to perform the operation of the service executing unit 13. Likewise, all of or part of the functional blocks 221 through 224 of the resource management apparatus 20 shown in FIG. 1 may be realized by hardware such as a semiconductor integrated circuit, or may be realized by a program or program codes recorded on a recording medium such as a nonvolatile memory or an optical disk. Such a program or program codes are designed to cause a computer having a processor such as a CPU to perform all of or part of the operations of the functional blocks 221 through 224.

The first table storage unit 225 and the second table storage unit 226 can be formed with a recording medium (a semiconductor memory or a magnetic recording medium, for example) such as a volatile memory or a nonvolatile memory, and a circuit and a program designed to perform data reading and writing on the recording medium. The first table storage unit 225 and the second table storage unit 226 may be formed in a predetermined storage area in the recording medium in advance, or may be formed in an appropriate storage area to be allocated during an operation of the resource management apparatus 20.

Figure 5:
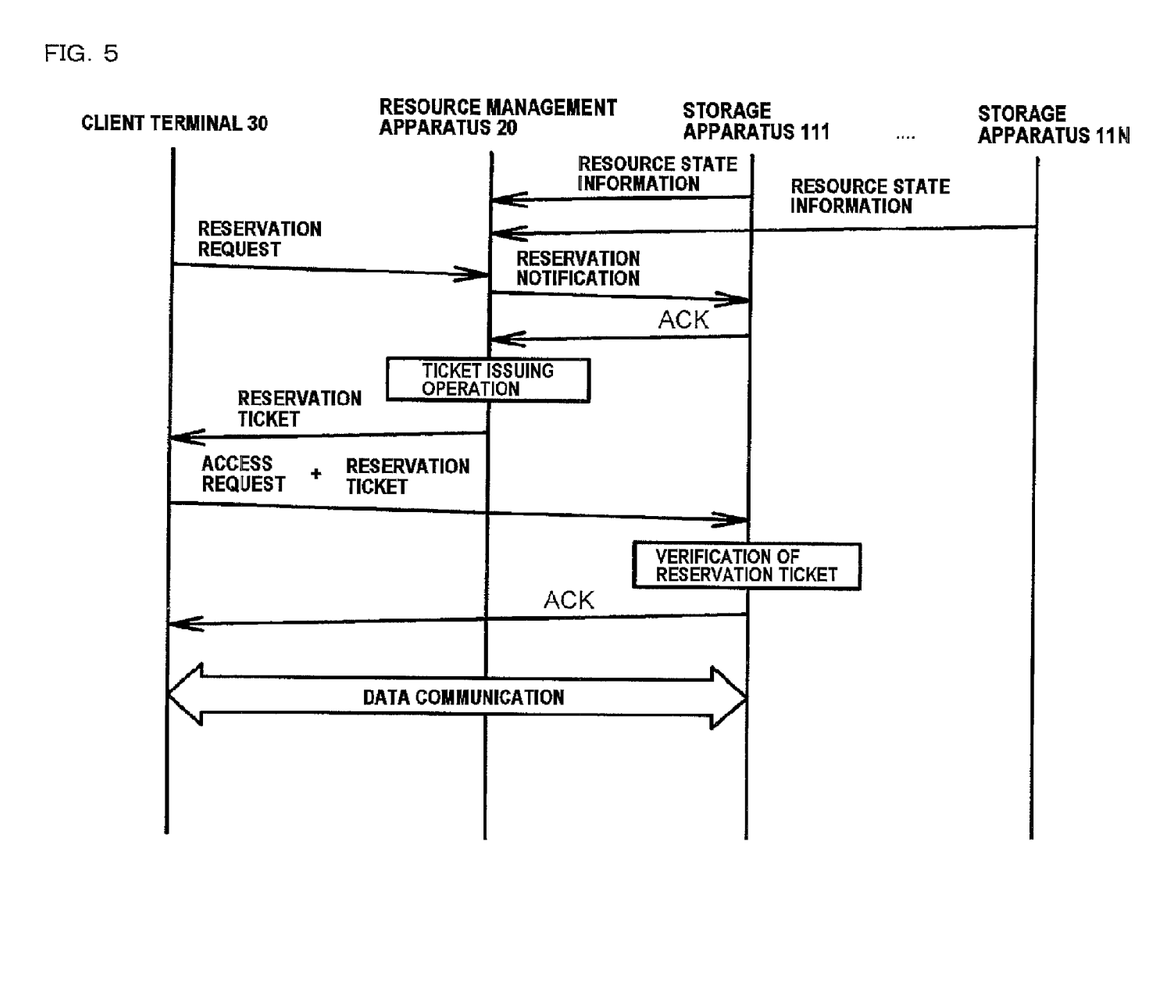
FIG. 5 schematically shows a communication sequence to be executed by the storage management system of the first embodiment.

An example of the operation of the storage management system 10 having the above structure is now described. FIG. 5 schematically shows the communication sequence to be executed by the storage management system 10.

Referring to FIG. 5, each of the storage apparatuses 111 through 11N transmits its storage resource state information to the storage resource state management unit 223 of the resource management apparatus 20. Here, each of the storage apparatuses 111 through 11N may transmit its storage resource state information to the resource management apparatus 20 on a regular basis, such as every few seconds or every few minutes. Alternatively, each of the storage apparatuses 111 through 11N may transmit its storage resource state information to the resource management apparatus 20, in response to a request from the storage resource state management unit 223.

As shown in FIG. 5, when the reservation setting unit 311 of the client terminal 30 transmits a reservation request to the resource management apparatus 20, the reservation management unit 221 of the resource management apparatus 20 reserves in advance the right of use and a time slot of use of the remaining capability of the storage capability in a storage apparatus 111. The reservation management unit 221 sends a reservation notification to the storage apparatus 111. Upon receipt of ACK (acknowledgement) from the storage apparatus 111 in reply to the reservation notification, the reservation management unit 221 sets the reservation information, and records the reservation information on the reservation table in the first table storage unit 225. The reservation management unit 221 also records the relationship between this reservation request and the storage apparatus 111 allocated to the reservation request on the storage resource allocation table in the first table storage unit 225.

When determining that the client terminal 30 should use the striping technique in response to a reservation request from the client terminal 30, the reservation management unit 221 issues a reservation notification to each of the n storage apparatuses allocated to the client terminal 30. The reservation management unit 221 sets the reservation information, and records the reservation information on the reservation table, only when receiving ACK from all of the n storage apparatuses in reply to the reservation notifications. At the same time, the reservation management unit 221 records the relationships between the reservation request and the n storage apparatuses allocated to the reservation request on the storage resource allocation table.

The ticket issuance unit 222 of the resource management apparatus 20 then performs a ticket issuing operation to issue a reservation ticket and transmit the reservation ticket to the client terminal 30.

As the reserved time slot nears, the reservation processing unit 312 of the client terminal 30 inquires of the reservation management unit 221 about which one of the storage apparatuses 111 through 11N is allocated to the client terminal 30. In reply to the inquiry, the reservation management unit 221 notifies the client terminal 30 of the identification information about the storage apparatus 111. After that, the reservation processing unit 312 transmits an access request as well as a reservation ticket to the storage apparatus 111. After verifying the reservation ticket and confirming the validity of the reservation ticket, the storage apparatus 111 transmits an ACK signal to the client terminal 30.

When the client terminal 30 issues the access request, the client terminal 30 may obtain information on each the storage apparatuses 111 through 11N from the resource management apparatus 20, may obtain control right of each the storage apparatuses 111 through 11N from the resource management apparatus 20, or need not have these.

Upon receipt of the ACK signal from the storage apparatus 111 via the communication interface 32, the reservation processing unit 312 establishes a connection with the storage apparatus 111, and performs a data communication.

The advantages of the storage management system 10 are as follows.

In the storage management system 10, the reservation management unit 221 reserves in advance the right of use and the time slot of use of the remaining capability of the storage capability in the storage apparatuses 111 through 11N, in accordance with a reservation request sent from the client terminal 30. The client terminal 30 can certainly use the storage capability in a storage apparatus 11i reserved through the reservation ticket in the reserved time slot. Although only the client terminal 30 is shown in FIG. 1, the resource management apparatus 20 can process reservation requests from a large indefinite number of client terminals. Accordingly, access request concentration on the storage apparatuses 111 through 11N from a large number of client terminals via the communication network NW can be prevented, and the quality of service to access request based on the reservation can be guaranteed to the capability reserved.

The client terminal 30 executes each of processing that transmits reservation requests to the resource management apparatus 20, inquires of the reservation management unit 221 of the resource management apparatus 20 about which one of the storage apparatuses is allocated to the client terminal 30, or transmits the access request to the storage apparatus 111 autonomous as above stated. In other word, the client terminal 30 independently sets the reservation time to hope for the access request, and can issue the access request at the set time.

As described above, when determining that the client terminal 30 should use the striping technique in accordance with a reservation request from the client terminal 30, the reservation management unit 221 selects n storage apparatuses from the storage apparatuses 111 through 11N in accordance with the reservation request, and can reserve the right of use of the storage capacities in those storage apparatuses. Accordingly, the load on each of the storage apparatuses 111 through 11N can be evenly distributed, and accessibility can be guaranteed.

Further, the reservation management unit 221 makes a reservation by referring to the resource state management table (FIG. 2) stored in the second table storage unit 226.

Accordingly, if a storage apparatus 11k of the storage apparatuses 111 through 11N breaks down or the storage apparatus 11k rapidly deteriorates, the storage apparatus 11k can be excluded from the objects to which reservations are to be allocated.

Second Embodiment

Figure 6:
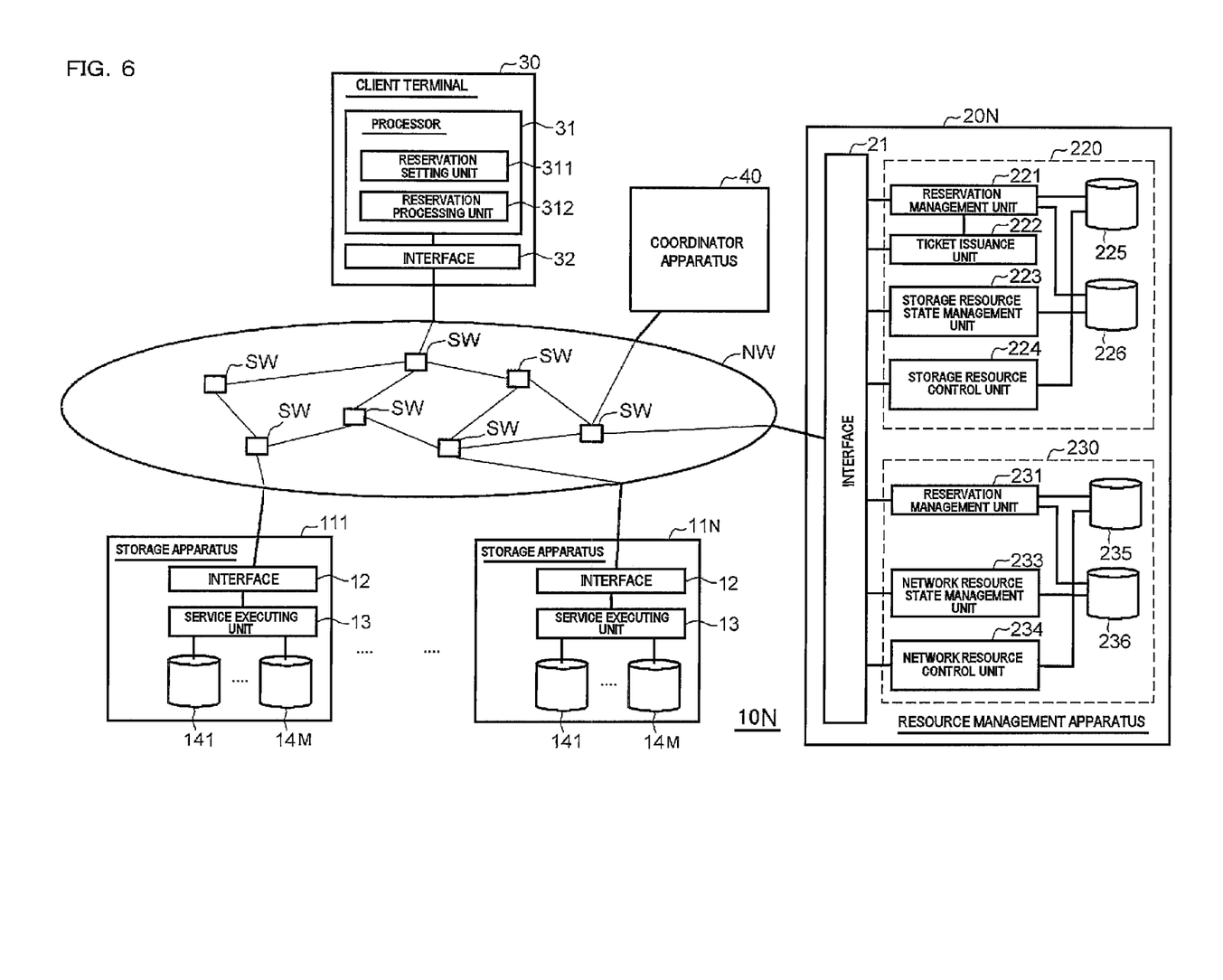
FIG. 6 is a functional block diagram schematically showing the structure of a storage management system according to a second embodiment of the present invention.

FIG. 6 is a functional block diagram schematically showing the structure of a storage management system 10N according to a second embodiment of the present invention. The storage management system 10N includes storage apparatuses 111 through 11N (N being a positive integer of 2 or larger), a resource management apparatus 20N, and a coordinator apparatus 40.

The resource management apparatus 20N includes a storage resource management unit 220, a network resource management unit 230, and a communication interface 21. The storage resource management unit 220 has the same structure as the resource management apparatus 20 of the first embodiment. In this embodiment, the storage resource management unit 220 and the network resource management unit 230 are incorporated into the same device, but are not limited to this arrangement. Instead, the storage resource management unit 220 and the network resource management unit 230 may be incorporated into different devices from each other.

A communication network NW has node switches SW that can dynamically set communication paths. In accordance with a control signal from the network resource management unit 230, the node switches SW can dynamically change communication paths.

In this embodiment, the client terminal 30 transmits a reservation request about the storage apparatuses 111 through 11N to the coordinator apparatus 40. In accordance with the reservation request, the coordinator apparatus 40 generates a reservation request about storage resources and a reservation request about network resources, and transmits those reservation requests to the storage resource management unit 220 and the network resource management units 230, respectively.

In accordance with the reservation request from the coordinator apparatus 40, the storage resource management unit 220 operates in the same manner as the resource management apparatus 20 of the first embodiment, and reserves in advance (provisionally reserves) the right of use and the time slot of use of the remaining capability of the storage capability of one of the storage apparatuses 111 through 11N. The storage resource management unit 220 then issues a reservation ticket (a provisional reservation ticket), and transmits the provisional reservation ticket to the coordinator apparatus 40.

Meanwhile, the network resource management unit 230 has the function to reserve one of the communication paths that can be formed with the node switches SW, in accordance with the reservation request from the coordinator apparatus 40. The network resource management unit 230 includes a reservation management unit 231, a network resource state management unit 233, a network resource control unit 234, a third table storage unit 235, and a fourth table storage unit 236.

Upon receipt of the reservation request sent from the coordinator apparatus 40, the reservation management unit 231 selects one of the communication paths that can be formed with the node switches SW, in accordance with the reservation request. The reservation management unit 231 reserves in advance (provisionally reserves) the right of use and the time slot of use of the available data transfer rate in the selected communication path, and records the reservation information indicating the reservation result on the reservation table in the third table storage unit 235. Simultaneously, the reservation management unit 231 records the information about the communication path allocated to the reservation information on the network resource allocation table in the third table storage unit 235. The reservation management unit 231 then transmits the reservation information (provisional reservation information) about the communication path to the coordinator apparatus 40.

At this point, the reservation management unit 231 refers to the reservation table and the network resource allocation table stored in the third table storage unit 235, and refers to the network resource state management table stored in the fourth table storage unit 236. By doing so, the reservation management unit 231 confirms the available data transfer rate in the communication network NW, and reserves a communication path in accordance with the reservation request. On the reservation table, the information about reservations received by the reservation management unit 231 is recorded. Request identifiers for referring to the network resource allocation table are recorded on this reservation table. The information about communication paths and the current states of those communication paths (the network resource state information) is recorded on the network resource state management table. The relationships between reservation requests and the communication paths allocated to the reservation requests are recorded on the network resource allocation table.

The network resource state management unit 233 obtains the information about the available data transfer rate in the communication paths and the current states of the communication paths such as the existence of a disconnection (the network resource state information) from the node switches SW. The network resource state management unit 233 causes the network resource state management table to reflect the obtained network resource state information.

Upon receipt of the provisional reservation ticket from the storage resource management unit 220 and the provisional reservation information from the network resource management unit 230, the coordinator apparatus 40 issues a reservation ticket including the contents of the provisional reservation ticket and the provisional reservation information, and transmits the reservation ticket to the client terminal 30.

The network resource control unit 234 has the function to control the operations of the node switches SW and dynamically change communication paths. The network resource control unit 234 refers to the reservation table, the network resource state management table, and the network resource allocation table. By doing so, the network resource control unit 234 forms communication paths in the communication network NW in accordance with the committed reservation information.

All of or part of the functional blocks 221 through 224 and 231 through 234 forming the resource management apparatus 20N shown in FIG. 6 may be realized by hardware such as a semiconductor integrated circuit, or may be realized by a program or program codes recorded on a recording medium such as a nonvolatile memory or an optical disk. Such a program or program codes are designed to cause a computer having a processor such as a CPU to perform all of or part of the operations of the functional blocks 221 through 224 and 231 through 234.

Figure 7:
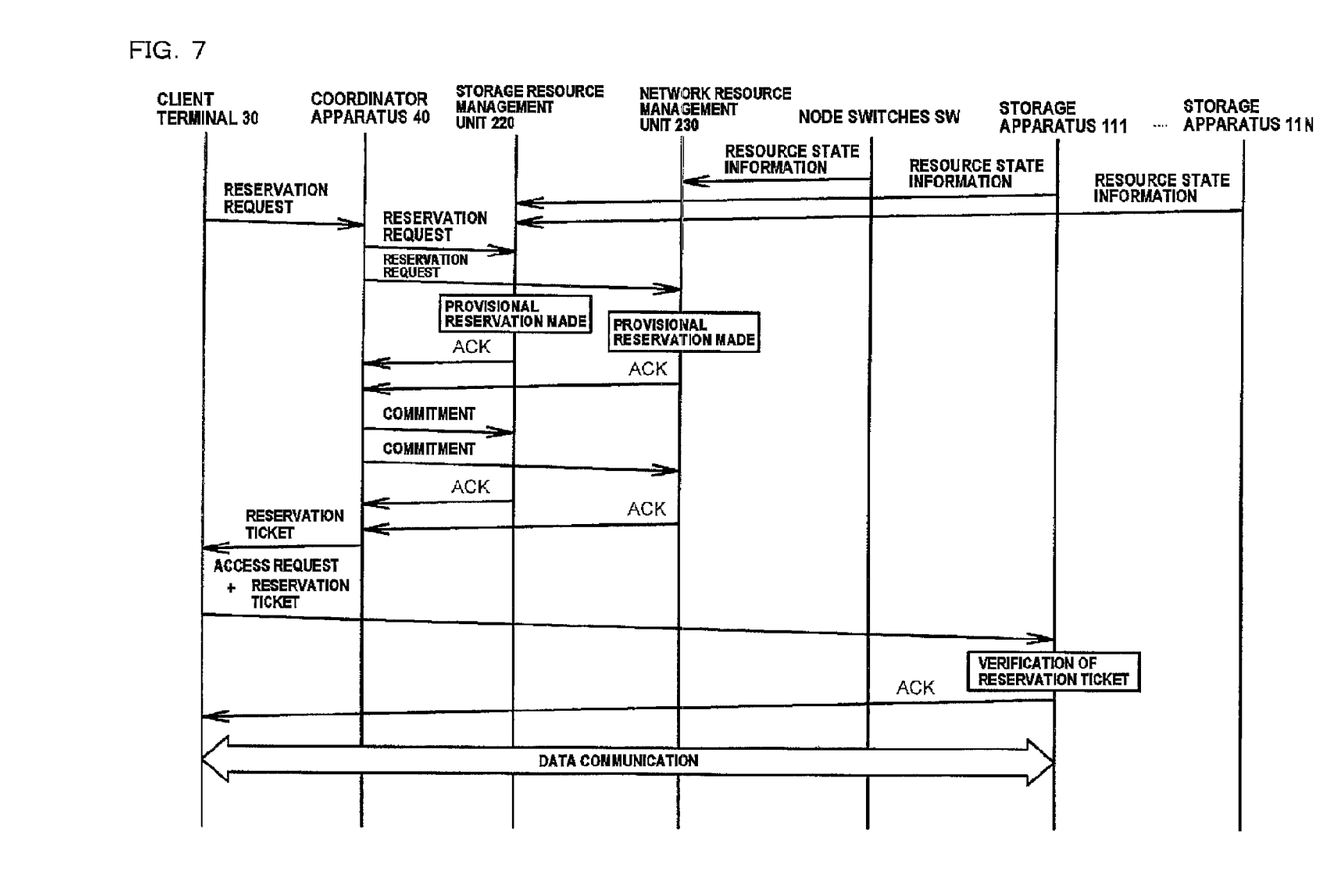
FIG. 7 schematically shows a communication sequence to be executed by the storage management system of the second embodiment.

An example of the operation of the storage management system 10N having the above structure is now described. FIG. 7 schematically shows the communication sequence to be executed by the storage management system 10N.

Referring to FIG. 7, each of the storage apparatuses 111 through 11N transmits its storage resource state information to the storage resource state management unit 223 of the resource management apparatus 20N. At the same time, the node switches SW transmit the network resource state information to the network resource state management unit 233 of the resource management apparatus 20N. Here, the node switches SW may transmit the network resource state information to the network resource state management unit 233 on a regular basis, such as every few seconds or every few minutes. Alternatively, the node switches SW may transmit the network resource state information to the network resource state management unit 233, in response to a request from the network resource state management unit 233.

Figure 8:
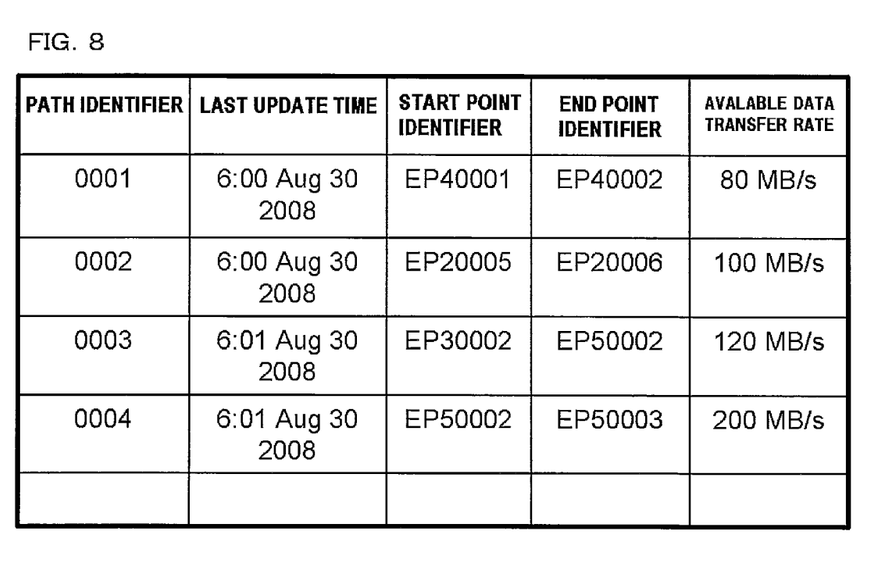
FIG. 8 shows an example of the network resource state management table on which the network resource state information is recorded.

FIG. 8 shows an example of the network resource state management table on which the network resource state information is recorded. The field of "path identifier" indicates the identifiers unique to the respective communication paths. The field of "last update time" indicates the last update times and dates of the information corresponding to the path identifiers. The field of "start point identifier" indicates the identifiers of node switches serving as the starting points of the communication paths. The field of "end point identifier" indicates the identifiers of node switches serving as the ending points of the communication paths. The field of "available data transfer rate" indicates the available data transfer rate in the communication paths.

As shown in FIG. 7, the reservation setting unit 311 of the client terminal 30 transmits a reservation request to the coordinator apparatus 40. The reservation request contains the "access start time", the "access time", the "file size to be transmitted or received in the data communication", the "communication rate", and the like. Based on this reservation request, the coordinator apparatus 40 plans to reserve the use of the storage apparatuses 111 through 11N and reserve the use of the network resources. More specifically, in accordance with the reservation request, the coordinator apparatus 40 generates a reservation request about the storage resources and a reservation request about the network resources, as described above, and then transmits the reservation requests to the storage resource management unit 220 and the network resource management unit 230, respectively.

Figure 9:
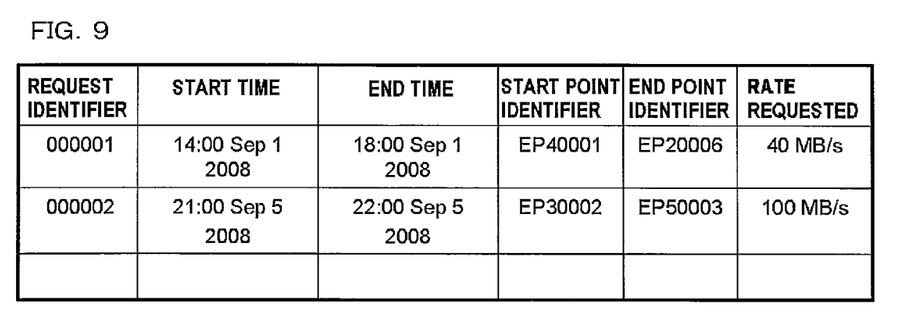
FIG. 9 shows an example of the reservation table.

FIG. 9 shows an example of the reservation table stored in the third table storage unit 235. The field of "request identifier" indicates the identifiers uniquely representing reservation requests. The field of "start time" indicates the start times of reserved time slots of use. The field of "end time" indicates the end times of reserved time slots of use. The filed of "start point identifier" indicates the identifiers of the node switches serving as the starting points of reserved communication paths. The field of "end point identifier" indicates the identifiers of the node switches serving as the ending points of the reserved communication paths. The field of "rate requested" indicates the reserved data transfer rate in the reserved communication paths.

Figure 10:
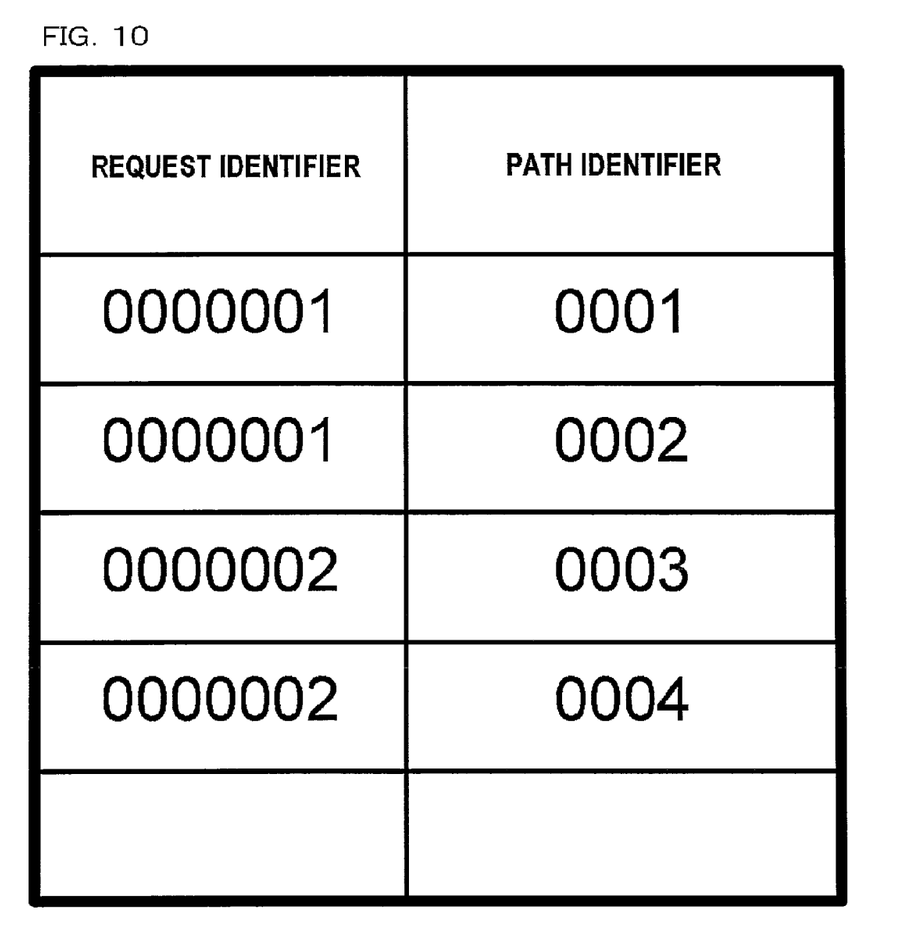
FIG. 10 shows an example of the network resource allocation table.

FIG. 10 shows an example of the network resource allocation table stored in the third table storage unit 235. In the table shown in FIG. 10, the field of "path identifier" indicates the identifiers representing the communication paths corresponding to the respective request identifiers shown in FIG. 9.

In accordance with the reservation request sent from the coordinator apparatus 40, the storage resource management unit 220 selects the storage apparatus 111 from the storage apparatuses 111 through 11N, and provisionally reserves in advance the right of use and the time slot of use of the storage capability in the storage apparatus 111. The storage resource management unit 220 then transmits an ACK signal to the coordinator apparatus 40. Meanwhile, the network resource management unit 230 provisionally reserves an available data transfer rate and a time slot of use of one of the communication paths that can be formed in the communication network NW. The network resource management unit 230 then transmits an ACK signal to the coordinator apparatus 40.

When at least one of the storage resource management unit 220 and the network resource management unit 230 fails to make a provisional reservation, a notification to that effect is sent to the coordinator apparatus 40. The coordinator apparatus 40 again plans to reserve the use of the storage apparatuses 111 through 11N and reserve the use of the network resources.

When receiving the ACK signals from both the storage resource management unit 220 and the network resource management unit 230, the coordinator apparatus 40 transmits commitment information indicating the secured reservation to the storage resource management unit 220 and the network resource management unit 230. In accordance with the commitment information received from the coordinator apparatus 40, the storage resource management unit 220 transmits a provisional reservation ticket as well as an ACK signal to the coordinator apparatus 40. In accordance with the commitment information received from the coordinator apparatus 40, the network resource management unit 230 also transmits provisional reservation information as well as an ACK signal to the coordinator apparatus 40. Upon receipt of the ACK signals from both the storage resource management unit 220 and the network resource management unit 230, the coordinator apparatus 40 issues a reservation ticket containing the contents of the provisional ticket and the provisional reservation information, and transmits the reservation ticket to the client terminal 30.

As the reserved time slot nears, the coordinator apparatus 40 inquires of the storage resource management unit 220 about which one of the storage apparatuses 111 through 11N is allocated to the client terminal 30. In reply to this inquiry, the reservation management unit 221 of the storage resource management unit 220 notifies the client terminal 30 of the identification information about the storage apparatus 111.

At the same time, the coordinator apparatus 40 inquires of the network resource management unit 230 about which one of the communication path is allocated. In reply to this inquiry, the reservation management unit 231 of the network resource management unit 230 notifies the coordinator apparatus 40 of the information about the communication path (the node address information defining the communication path, for example). The coordinator apparatus 40 then notifies the storage resource management unit 220 of the information about the communication path obtained as a result. The storage resource management unit 220 then transfers the information about the communication path to the storage apparatus 111 allocated to the client terminal 30.

As the reserved time slot nears, the reservation processing unit 312 of the client terminal 30 transmits a reservation ticket to the coordinator apparatus 40. In accordance with the reservation ticket, the coordinator apparatus 40 transmits the identification information about the storage apparatus 111 to the client terminal 30, and transmits the information about the communication path obtained from the reservation management unit 231 of the network resource management unit 230, to the client terminal 30.

After that, the reservation processing unit 312 accesses the allocated storage apparatus 111 through the communication path (the node) designated by the information received from the coordinator apparatus 40, and transmits an access request, as well as a reservation ticket about the storage apparatus 111, to the storage apparatus 111. After verifying the reservation ticket and confirming the validity of the reservation ticket, the storage apparatus 111 transmits an ACK signal to the client terminal 30.

Upon receipt of the ACK signal from the storage apparatus 111 via the communication interface 32, the reservation processing unit 312 establishes a connection with the storage apparatus 111, and performs a data communication.

The advantages of the storage management system 10N are as follows.

As described above, the network resource management unit 230 can reserve a data transfer rate in communication paths beforehand by controlling the node switches SW in the communication network NW. Even if a data communication can be performed in a reserved time slot of use of a storage resource (the storage apparatuses 111 through 11N), operations might not progress as scheduled in the reservation management table stored in the first table storage unit 225 when the available data transfer rate greatly varies. In this embodiment, variations of data transfer rate can be restricted by reserving a data transfer rate in communication paths beforehand. Accordingly, a data communication between the client terminal 30 and one of the storage apparatuses 111 through 11N can be performed according to the reservation management table without interruption.

Although the embodiments of the present invention have been described with reference to the drawings, those embodiments are merely examples of the invention, and other various structures may be employed. For example, in the second embodiment, the storage resource management unit 220 includes the ticket issuance unit 222, but the present invention is not limited to that structure. Also, the reservation management unit 221 may transmit provisional reservation information to the coordinator apparatus 40, instead of a provisional ticket.

It is apparent that the present invention is not limited to the above embodiments, and may be modified and changed without departing from the scope and spirit of the invention.

Moreover, it explained that a communication network NW is connected with a single client terminal as above embodiments. However, a communication network NW may be connected with two or more client terminals. In the latter, even if an access request issued from one client terminal that accepts reservation ticket compete with an access request issued from other client terminal that does not accept reservation ticket, one client terminal can surely execute the data communication at the time reserved beforehand.

Moreover, the client terminal and the resource management apparatus need not necessarily be always individual devices though explained that they are individual devices. A single device only has to possess those explained function of them.

The invention claimed is:

1. A storage management system that connects at least one client terminal to at least one storage apparatus via a communication network, comprising:
a communication interface that receives a reservation request from said client terminal;
a reservation manager that reserves a right of use of remaining capability of storage capability in said storage apparatus and a time slot of use of said remaining capability, in accordance with said reservation request, and manages reservation information indicating a result of said reservation, said storage capability including a data read rate and a data write rate for a data storage area, said storage capability including a free space in the data storage area; and a ticket issuer that issues a reservation ticket based on said reservation information to said client terminal, and transmits said reservation ticket to said client terminal, said ticket issuer issuing said reservation ticket only when said remaining capability is confirmed, said storage management system further comprising:

a first table storage that stores a reservation management table on which a reservation state of said storage capability in said storage apparatus is recorded, said reservation management table including, as said reservation state of said storage capability for each reservation request from said client terminal, information about storage resources allocated to said reservations, reserved storage capability, and reserved time slot of use of said remaining capability; and a second table storage that stores a resource state management table on which storage resource state information indicating a current state of said storage capability of said storage apparatus is recorded, wherein said reservation manager, confirms said storage capabilities of said storage resources allocated to the other reservations at a time corresponding to the reservation time set by said client terminal to hope for an access request according to said reservation state in said reservation management table, refers said storage capabilities of said storage resources to said current state of said storage capability of said storage apparatus based on said storage resource state information in said storage state management table to obtain and check the remaining capability of said storage capability of said storage apparatus, allocates said remaining capability of said storage capability of said storage apparatus to said reservation request to reserve a time slot of use of said remaining capability, and causes said reservation management table to reflect said reservation information, the reserved time slot being indicated by start time and end time thereof.

2. The storage management system as claimed in claim 1, further comprising:

a resource manager that receives storage resource state information indicating a current state of said storage capability from said storage apparatus, and records said storage resource state information on a resource state management table, wherein said second table storage stores said resource state management table recorded by said resource manager.

3. The storage management system as claimed in claim 1, further comprising said storage apparatus, wherein said storage apparatus includes a service executor that performs a data communication with said client terminal while accessing a data storage area with the use of said remaining capability in a reserved time slot, only when receiving an access request and said reservation ticket from said client terminal.

4. The storage management system as clamed in claim 3, wherein a plurality of storage apparatuses exist, said reservation manager selects a storage apparatus having said remaining capability from said plurality of storage apparatuses in accordance with said reservation request, allocates said selected storage apparatus to said client terminal, and reserves a right of use of remaining capability of said storage capability in said selected storage apparatus and a time slot of use of said remaining capability, and said reservation management table stores reservation information corresponding to said plurality of storage apparatuses.

5. The storage management system as claimed in claim 3, wherein said service executor performs said data communication while performing data reading or writing on said data storage area.

6. The storage management system as claimed in claim 3, wherein said ticket issuer has a function to generate electronic signature data while issuing said reservation ticket, and transmit said reservation ticket and said electronic signature data to said client terminal, and when receiving said reservation ticket and said electronic signature data from said client terminal, said service executor allows access to said data storage area only after verifying that said electronic signature data has authenticity and confirming validity of said reservation ticket.

7. The storage management system as claimed in claim 6, wherein access to said data storage area is preferentially or exclusively allowed.

8. The storage management system as claimed in claim 1, wherein said reservation manager selects n (n being an integer of 2 or larger) storage apparatuses from said plurality of storage apparatuses in accordance with said reservation request, allocates said selected n storage apparatuses to said client terminal, and reserves a right of use of remaining capability of said storage capability in said selected n storage apparatuses and a time slot of use of said remaining capability, and when receiving said reservation ticket and an access request for data writing from said client terminal, each of said n storage apparatuses receives a plurality of data blocks generated by striping from said client terminal, and each corresponding service executor stores said data blocks into data storage areas allocated to said corresponding service executor, in accordance with said access request.

9. A storage management method of a storage management system, the storage management method for connecting at least one terminal to at least one storage apparatus via a communication network, comprising:

receiving a reservation request from said client terminal;

reserving a right of use of remaining capability of storage capability in said storage apparatus and a time slot of use of said remaining capability, in accordance with said reservation request, and managing reservation information indicating a result of said reservation, said storage capability including a data read rate and a data write rate for a data storage area, said storage capability including a free space in the data storage area; and issuing a reservation ticket based on said reservation information to said client terminal, and transmitting said reservation ticket to said client terminal, said reservation ticket being issued only when said remaining capability is confirmed, said storage management system further comprising:

a first table storage that stores a reservation management table on which a reservation state of said storage capability in said storage apparatus is recorded, said reservation management table including, as said reservation state of said storage capability for each reservation request from said client terminal, information about storage resources allocated to said reservations, reserved storage capability, and reserved time slot of use of said remaining capability; and a second table storage that stores a resource state management table on which storage resource state information indicating a current state of said storage capability of said storage apparatus is recorded, wherein said storage management method further comprises:

confirming said storage capabilities of said storage resources allocated to the other reservations at a time corresponding to the reservation time set by said client terminal to hope for an access request according to said reservation state in said reservation management table, referring said storage capabilities of said storage resources to said current state of said storage capability of said storage apparatus based on said storage resource state information in said storage state management table to obtain and check the remaining capability of said storage capability of said storage apparatus, allocating said remaining capability of said storage capability of said storage apparatus to said reservation request to reserve a time slot of use of said remaining capability, and causing said reservation management table to reflect said reservation information, the reserved time slot being indicated by start time and end time thereof.

10. The storage management method as claimed in claim 9, further comprising:

receiving storage resource state information indicating a current state of said storage capability from said storage apparatus, and recording said storage resource state information on a resource state management table, wherein said second table storage stores said resource state management table.

11. The storage management method as claimed in claim 9, wherein a plurality of storage apparatuses exist, said reserving a right of use and a time slot of use of said remaining capability includes selecting a storage apparatus having said remaining capability from said plurality of storage apparatuses in accordance with said reservation request, allocating said selected storage apparatus to said client terminal, and reserving a right of use of remaining capability of said storage capability in said selected storage apparatus and a time slot of use of said remaining capability, and said reservation management table stores reservation information corresponding to said plurality of storage apparatuses.

12. The storage management method as claimed in claim 9, wherein said reserving a right of use and a time slot of use of said remaining capability includes selecting n (n being an integer of 2 or larger) storage apparatuses from said plurality of storage apparatuses in accordance with said reservation request, allocating said selected n storage apparatuses to said client terminal, and reserving a right of use of remaining capability of said storage capability in said selected n storage apparatuses and a time slot of use of said remaining capability, and when receiving said reservation ticket and an access request for data writing from said client terminal, each of said n storage apparatuses receives a plurality of data blocks generated by striping from said client terminal, and each of said storage apparatuses stores said data blocks into data storage areas allocated to said storage apparatuses, in accordance with said access request.

13. The storage management method as claimed in claim 9, wherein said issuing a reservation ticket includes generating electronic signature data while issuing said reservation ticket, and transmitting said reservation ticket and said electronic signature data to said client terminal.

14. A non-transitory computer-readable recording medium storing a program for causing a computer to perform a storage management operation to connect at least one client terminal to at least one storage apparatus via a communication network, the storage management operation includes:

receiving a reservation request from said client terminal;

reserving a right of use of remaining capability of storage capability in said storage apparatus and a time slot of use of said remaining capability, in accordance with said reservation request, and managing reservation information indicating a result of said reservation, said storage capability including a data read rate and a data write rate for a data storage area, said storage capability including a free space in the data storage area; and issuing a reservation ticket based on said reservation information to said client terminal, and transmitting said reservation ticket to said client terminal, said reservation ticket being issued only when said remaining capability is confirmed, said storage management system further comprising:

a first table storage that stores a reservation management table on which a reservation state of said storage capability in said storage apparatus is recorded, said reservation management table including, as said reservation state of said storage capability for each reservation request from said client terminal, information about storage resources allocated to said reservations, reserved storage capability, and reserved time slot of use of said remaining capability; and a second table storage that stores a resource state management table on which storage resource state information indicating a current state of said storage capability of said storage apparatus is recorded, wherein said storage management operation further comprises:

confirming said storage capabilities of said storage resources allocated to the other reservations at a time corresponding to the reservation time set by said client terminal to hope for an access request according to said reservation state in said reservation management table, referring said storage capabilities of said storage resources to said current state of said storage capability of said storage apparatus based on said storage resource state information in said storage state management table to obtain and check the remaining capability of said storage capability of said storage apparatus, allocating said remaining capability of said storage capability of said storage apparatus to said reservation request to reserve a time slot of use of said remaining capability, and causing said reservation management table to reflect said reservation information, the reserved time slot being indicated by start time and end time thereof.

* * * * *